(12) United States Patent
    Zhang (10) Patent No.: US 11,421,738 B2
(45) Date of Patent: Aug. 23, 2022

(54) BEARING SEALING DEVICE

(71) Applicant: UCHIYAMA MANUFACTURING CORP., Okayama (JP)

(72) Inventor: Junpei Zhang, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 338 days.

(21) Appl. No.: 16/821,587

(22) Filed: Mar. 17, 2020

(65) Prior Publication Data

US 2020/0300305 A1    Sep. 24, 2020

(30) Foreign Application Priority Data

Mar. 18, 2019  (JP) .............................. JP2019-049390

(51) Int. Cl.
   *F16C 33/80*     (2006.01)
   *F16C 33/78*     (2006.01)
   *F16J 15/3232*   (2016.01)
   *F16J 15/16*     (2006.01)
   *F16J 15/00*     (2006.01)

(52) U.S. Cl.
   CPC .......... *F16C 33/805* (2013.01); *F16C 33/782* (2013.01); *F16C 33/7826* (2013.01); *F16C 33/7866* (2013.01); *F16C 33/7869* (2013.01); *F16J 15/3232* (2013.01);
   (Continued)

(58) Field of Classification Search
   CPC .... F16C 33/78; F16C 33/782; F16C 33/7823; F16C 33/7826; F16C 33/7869; F16C 33/7873; F16C 33/7876; F16C 33/7886; F16C 33/80; F16C 33/805; F16J 15/3232; F16J 15/3252; F16J 15/3268; B60B 27/0073
   See application file for complete search history.

(56) References Cited

U.S. PATENT DOCUMENTS 5,813,675 A *   9/1998  Otto ................... F16C 33/7896
                                                    277/572
8,702,314 B2 *  4/2014  Takimoto .............. F16C 33/783
                                                    384/486
(Continued)

FOREIGN PATENT DOCUMENTS

JP          2018071739 A     5/2018

*Primary Examiner* — Nicholas L Foster
(74) *Attorney, Agent, or Firm* — Muncy, Geissler, Olds & Lowe, P.C.

(57) ABSTRACT

A bearing sealing device including a slinger member having a slinger cylindrical portion, a slinger flange portion, and a slinger outer diametrical cylindrical portion projecting from an outer diametrical side end portion of the slinger flange portion so as to overlap in diametrical direction with a step portion of the flange, and including a seal member having a seal member having a core member and a seal lip member. A seal outer diametrical cylindrical portion having a region facing an outer circumferential face of the slinger outer diametrical cylindrical portion and projecting so as to overlap in diametrical direction with the step portion is provided on an outer diametrical side end portion of the seal member. A projecting distal end portion of the seal outer diametrical cylindrical portion projects toward a side of the step portion further than a projecting distal end portion of the slinger outer diametrical cylindrical portion.

11 Claims, 6 Drawing Sheets

(52) U.S. Cl.
CPC ......... *F16C 33/7896* (2013.01); *F16J 15/002* (2013.01); *F16J 15/164* (2013.01)

(56) References Cited

U.S. PATENT DOCUMENTS

| | | | | |
|---|---|---|---|---|
| 8,905,641 B2* | 12/2014 | Duch | ................ | F16C 33/7886 384/480 |
| 8,979,385 B2* | 3/2015 | Haepp | ................ | F16C 33/7886 384/488 |
| 9,090,122 B2* | 7/2015 | Morita | ................ | B60B 27/0073 |
| 9,475,343 B2* | 10/2016 | Wakisaka | ................ | B60B 27/0073 |
| 9,546,687 B2* | 1/2017 | Kaiser | ................ | F16C 33/7823 |
| 9,695,938 B2* | 7/2017 | Suzuki | ................ | F16J 15/3284 |
| 9,982,719 B2* | 5/2018 | Harada | ................ | F16C 33/7826 |
| 10,119,571 B2* | 11/2018 | Seno | ................ | F16C 33/80 |
| 10,208,802 B2* | 2/2019 | Kato | ................ | F16J 15/3264 |
| 10,240,674 B2* | 3/2019 | Sakai | ................ | F16J 15/40 |
| 10,293,531 B2* | 5/2019 | Kato | ................ | B29C 45/1418 |
| 10,479,139 B2* | 11/2019 | Tada | ................ | F16C 33/7876 |
| 10,591,060 B2* | 3/2020 | Villalobos | ................ | F16J 15/002 |
| 10,612,597 B2* | 4/2020 | Kato | ................ | F16J 15/3264 |
| 10,663,003 B2* | 5/2020 | Kato | ................ | F16C 33/805 |
| 10,746,229 B2* | 8/2020 | Lim | ................ | F16C 33/78 |
| 10,794,428 B2* | 10/2020 | Shuto | ................ | F16C 33/80 |
| 10,920,823 B2* | 2/2021 | Krapf | ................ | F16C 33/7886 |
| 10,975,913 B2* | 4/2021 | Koizumi | ................ | B60B 27/0073 |
| 11,286,991 B2* | 3/2022 | Kim | ................ | F16C 33/7886 |
| 2007/0278748 A1* | 12/2007 | Matsui | ................ | F16C 33/7876 277/549 |
| 2013/0241270 A1 | 9/2013 | Morita | ................ | F16C 33/7879 301/110 |
| 2013/0243360 A1* | 9/2013 | Takimoto | ................ | F16C 33/783 384/486 |
| 2014/0003753 A1* | 1/2014 | Haepp | ................ | F16C 33/805 384/480 |
| 2015/0110432 A1* | 4/2015 | Wakisaka | ................ | F16C 33/805 384/486 |
| 2015/0151573 A1* | 6/2015 | Shibayama | ................ | F16J 15/447 277/351 |
| 2015/0316151 A1* | 11/2015 | Suzuki | ................ | F16J 15/3232 277/562 |
| 2016/0003302 A1* | 1/2016 | Seno | ................ | F16J 15/3232 277/351 |
| 2016/0114624 A1* | 4/2016 | Morello | ................ | F16C 33/80 384/480 |
| 2016/0131257 A1* | 5/2016 | Sakai | ................ | B60B 27/0073 277/351 |
| 2016/0178010 A1* | 6/2016 | Kaiser | ................ | F16C 33/7896 277/351 |
| 2016/0221391 A1* | 8/2016 | Lim | ................ | F16J 15/3264 |
| 2016/0245340 A1* | 8/2016 | Kaiser | ................ | F16C 33/7876 |
| 2016/0250788 A1* | 9/2016 | Kato | ................ | F16J 15/3276 264/266 |
| 2016/0290406 A1* | 10/2016 | Yano | ................ | B60B 27/001 |
| 2017/0335890 A1* | 11/2017 | Harada | ................ | F16C 33/782 |
| 2018/0066711 A1* | 3/2018 | Wakabayashi | ................ | F16C 33/7886 |
| 2018/0156277 A1* | 6/2018 | Yamane | ................ | F16C 33/78 |
| 2018/0172077 A1* | 6/2018 | Kato | ................ | F16J 15/3268 |
| 2018/0186181 A1* | 7/2018 | Tada | ................ | F16J 15/447 |
| 2018/0195558 A1* | 7/2018 | Kato | ................ | F16C 33/7879 |
| 2019/0049014 A1* | 2/2019 | Villalobos | ................ | F16J 15/002 |
| 2019/0271359 A1* | 9/2019 | Tarukawa | ................ | F16C 33/7876 |
| 2019/0277340 A1* | 9/2019 | Shuto | ................ | F16C 19/18 |
| 2020/0032848 A1* | 1/2020 | Koizumi | ................ | B60B 27/0073 |
| 2020/0292082 A1* | 9/2020 | Kato | ................ | F16J 15/3244 |
| 2020/0362967 A1* | 11/2020 | Seki | ................ | F16J 15/3456 |
| 2021/0010532 A1* | 1/2021 | Shiramizu | ................ | F16C 33/7826 |
| 2021/0033149 A1* | 2/2021 | Duch | ................ | F16C 33/7823 |
| 2021/0040992 A1* | 2/2021 | Barberis | ................ | F16C 33/7886 |
| 2021/0116034 A1* | 4/2021 | Seki | ................ | F16J 15/164 |
| 2021/0324909 A1* | 10/2021 | Konishi | ................ | F16C 19/183 |
| 2021/0355996 A1* | 11/2021 | Czech | ................ | F16C 33/7826 |

* cited by examiner

BEARING SEALING DEVICE

TECHNICAL FIELD

The present invention relates to a bearing sealing device which seals a space between a fixed side member and a rotation side member which rotates relative to the fixed side member.

BACKGROUND ART

As for a hub bearing which is used as a bearing device of a wheel supporting portion of a vehicle, the one which is constituted in such a manner that an inner ring with a flange to which a wheel is attached is supported in an axially rotatable manner relative to an outer ring which is fixed to a vehicle body is known in the art. For preventing intrusion of muddy water, dust or the like, a bearing sealing device is mounted in an end portion in the shaft L direction between the outer ring and the inner ring which are constituted as above. Patent Literature 1 is cited as an example of a literature in which the bearing sealing device as above is disclosed.

In the bearing sealing device disclosed in Patent Literature 1, an inclined portion (refer to Patent Literature 1, a first inclined portion 44) is provided in an outer diametrical side end portion of a slinger so as to form a wide space (refer to Patent Literature 1, a space S in FIG. 3) between the outer diametrical side end portion of the slinger and a side face which is curved in a concave shape and is formed at the flange.

CITATION LIST

Patent Literature

Patent Literature 1: Japanese Unexamined Patent Application Publication No. 2018-071739

SUMMARY OF INVENTION

Technical Problem

However, in the bearing sealing device disclosed in Patent Literature 1, labyrinth seal function is not sufficient because an outer diametrical side distal end portion of the slinger does not extend far enough to project into a concave portion formed at the flange and a space between the distal end portion of the slinger and the flange is too wide. In the bearing sealing device disclosed in Patent Literature 1, muddy water or the like intrudes into a fitting face between the flange of the inner ring and the slinger because the wide space S is a flow passage for letting out and discharging muddy water or the like.

The present invention is proposed in view of the above-mentioned problems. An object of the present invention is to provide a bearing sealing device which prevents intrusion of muddy water or the like and whose life is prolonged.

Solution to Problem

A bearing sealing device of one embodiment of the present invention mounted in a bearing device having an outer ring and an inner ring, the inner ring having a flange, is characterized in that the bearing sealing device is provided with a slinger member which is fitted to the inner ring; and a seal member which is fitted to the outer ring. The slinger member has a slinger cylindrical portion which is fitted to an outer diametrical face of the inner ring, a slinger flange portion which extends along the flange from one end portion of the slinger cylindrical portion to an outer diametrical side, and a slinger outer diametrical cylindrical portion which projects from an outer diametrical side end portion of the slinger flange portion so as to overlap in diametrical direction with a step portion which is formed in a stepped shape in the flange of the inner ring. The seal member has a core member which is fitted to the outer ring, and a seal lip member which is constituted with an elastic member fixed to the core member and has a seal lip portion which contacts or is adjacent to the slinger member. A seal outer diametrical cylindrical portion which has a region facing an outer circumferential face of the slinger outer diametrical cylindrical portion and projects so as to overlap in diametrical direction with the step portion is provided on an outer diametrical side end portion of the seal member. A projecting distal end portion of the seal outer diametrical cylindrical portion projects toward a side of the step portion further than a projecting distal end portion of the slinger outer diametrical cylindrical portion.

Advantageous Effects of Invention

In the bearing sealing device of the embodiment of the present invention constituted as above, the projecting distal end portion of the seal outer diametrical cylindrical portion of the seal member is projected toward the side of the step portion formed at the flange further than the projecting distal end portion of the slinger outer diametrical cylindrical portion. Accordingly, the projecting distal end portion of the seal outer diametrical cylindrical portion of the seal member and the projecting distal end portion of the slinger outer diametrical cylindrical portion are arranged so as to overlap with each other in the diametrical direction. Thereby, an opening which is located at an outermost diametrical side is guarded by the seal outer diametrical cylindrical portion, and an effect of suppressing intrusion of muddy water or the like from outside is improved. As a fitting face between the flange of the inner ring and the slinger is doubly covered with the seal outer diametrical cylindrical portion and the slinger outer diametrical cylindrical portion, seal function in the fitting face is also improved and life of the bearing sealing device is prolonged.

DESCRIPTION OF EMBODIMENTS

An embodiment of the present invention is explained below based on the drawings. Part of detailed reference signs allotted to other figures are omitted in some figures.

A bearing sealing device 8 of the embodiment is mounted in a bearing device 1 having an outer ring 2 and an inner ring 5 with a flange 32, and is provided with a slinger member 9 which is fitted to the inner ring 5 and a seal member 10 which is fitted to the outer ring 2. The slinger member 9 is provided with a slinger cylindrical portion 90 which is fitted to an outer diametrical face 30*a* of the inner ring 5, a slinger flange portion 91 which extends along the flange 32 from one end portion 90*a* of the slinger cylindrical portion 90 to an outer diametrical side, and a slinger outer diametrical cylindrical portion 92 which projects from an outer diametrical side end portion 91*a* of the slinger flange portion 91 so as to overlap in the diametrical direction, i.e. so as to overlap seen from the diametrical direction, with a step portion 32*b* which is formed in a stepped shape at the flange 32 of the inner ring 5. The seal member 10 is provided with a core member 11 which is fitted to the outer ring 2, and a seal lip member 12 which is composed of an elastic member fixed to the core member 11 and has seal lip portions 121, 122, 123 which contact or are adjacent to the slinger member 9. A seal outer diametrical cylindrical portion 13 which has a region 13*a* facing an outer circumferential face 92*a* of the slinger outer diametrical cylindrical portion 92 and projects so as to overlap with the step portion 32*b* in the diametrical direction is provided in an outer diametrical side end portion of the seal member 10. A projecting distal end portion 13*b* of the seal outer diametrical cylindrical portion 13 projects toward a side of the step portion 32*b* further than a projecting distal end portion 92*b* of the slinger outer diametrical cylindrical portion 92. A detailed explanation is to be mentioned below.

First Embodiment

A first embodiment is explained below with reference to FIGS. 1 and 2A.

Figure 1:
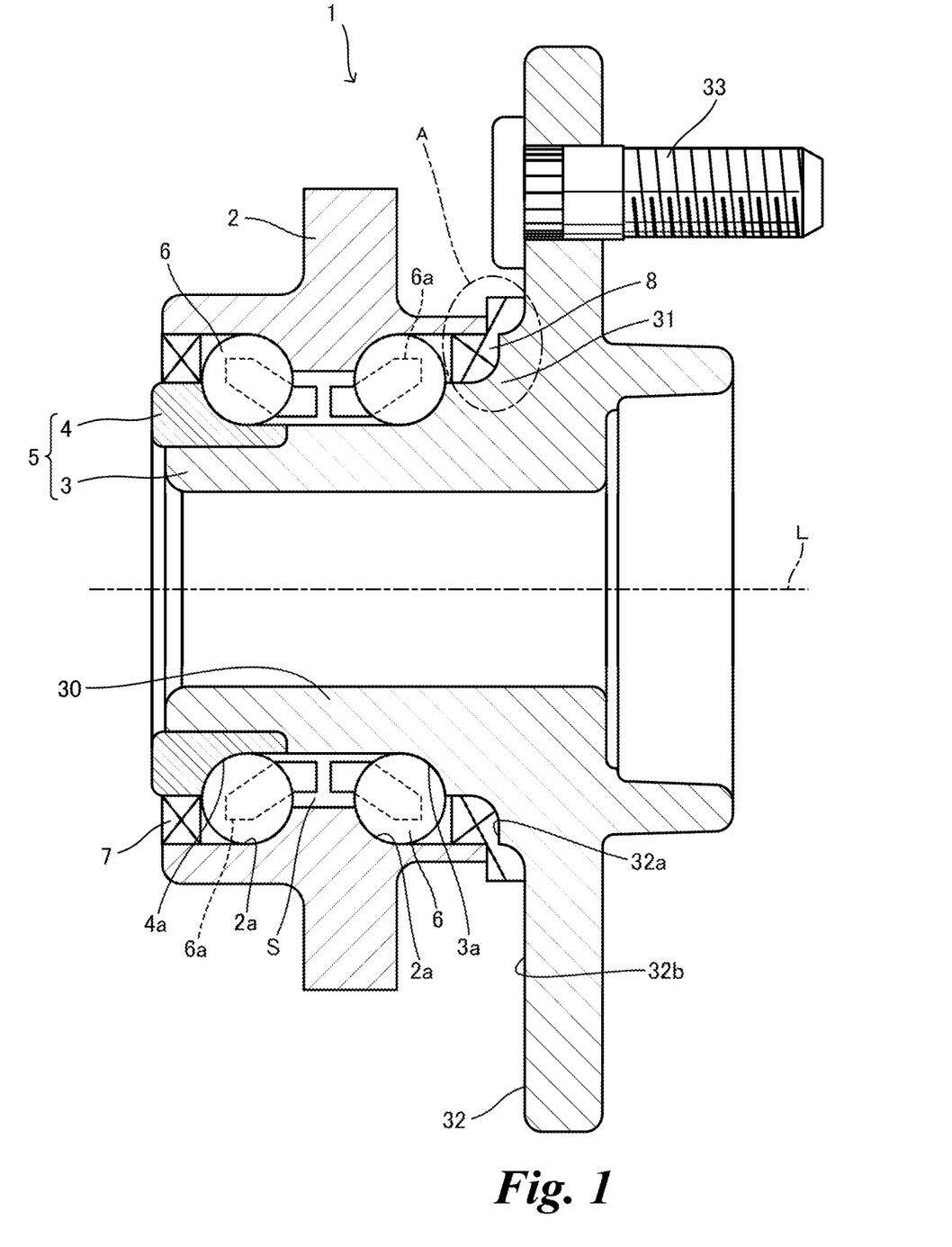
FIG. 1 is a longitudinal sectional view diagrammatically illustrating one example of the bearing device to which the bearing sealing device of the present invention is applied.

FIG. 1 illustrates a bearing device 1 (a mechanical device) which supports a wheel of a vehicle, not illustrated, in an axially rotatable manner. The bearing device 1 generally includes the outer ring 2, i.e. an outer member, a hub wheel 3, an inner ring member 4 which is integrally fitted to a vehicle body side of the hub wheel 3, and two rows of rolling elements 6 (balls) which are interposed between the outer ring 2 and the inner ring 5 (the hub wheel 3 and the inner ring member 4). In the aspect of the embodiment, the hub wheel 3 and the inner ring member 4 constitute the inner ring 5, i.e. an inner member. The outer ring 2 is fixed to a body of the vehicle, not illustrated. The hub wheel 3 is spline-fitted coaxially with a drive shaft, not illustrated. The inner ring 5 (the hub wheel 3 and the inner ring member 4) is rotatable around a shaft L to the outer ring 2. The outer ring 2 and the inner ring 5 are constituted as two members which rotate relatively and coaxially, and an annular bearing space S is formed between the two members. The two rows of rolling elements 6, which are retained by a retainer 6*a*, are provided in the bearing space S in such a manner that a track wheel 2*a* of the outer ring 2, a track wheel 3*a* of the hub wheel 3, and a track wheel 4*a* of the inner ring 4 are provided in a rotatable manner. The hub wheel 3 has a hub wheel body 30 in a cylindrical shape and the flange 32 (a hub flange) which is formed so as to continuously expand a diameter thereof outward in the diametrical direction from the hub wheel body 30 through a rising base portion 31. The wheel is attached and fixed to the hub flange 32 by a bolt 33 and a nut, not illustrated. The hub flange 32 in the figure has a rising portion 32*a* which continues into the rising base portion 31 and the step portion 32*b* which is formed in the stepped shape continuously from an outer diametrical side of the rising portion 32*a* (so as to be away from the bearing space S along the shaft L).

As used herein, a side toward the wheel along the shaft L direction (the right side of FIG. 1) is referred to as a wheel side, and a side towards the vehicle body (the left side of FIG. 1) is referred to as a vehicle body side.

Figure 2A:
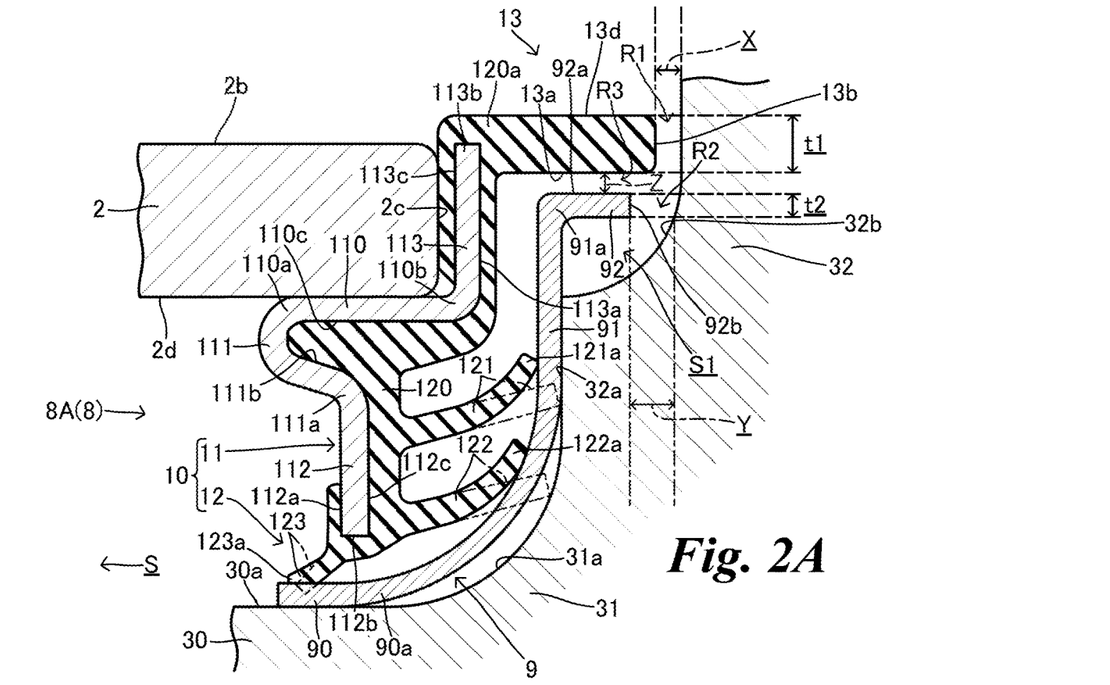
FIG. 2A is an enlarged view of a part A in FIG. 1 and is a schematic sectional view diagrammatically illustrating a bearing sealing device of a first embodiment of the present invention.

A bearing sealing device 8 of the first embodiment in FIG. 2A is a bearing sealing device 8A which is mounted in an end portion (FIG. 1, part A) between the outer ring 2 and the hub wheel body 30 of the hub wheel 3 on the wheel side, the hub wheel 3 and the inner ring member 4 constituting the inner ring 5. By the bearing sealing device 8A, the bearing space S is sealed, and intrusion of muddy water or the like into the bearing space S or leaking of lubricant such as grease which is filled in the bearing space S is prevented.

The slinger member 9 is formed by pressing a steel plate such as SPCC or SUS. The slinger member 9 has the slinger cylindrical portion 90 which is fitted to the outer diametrical face 30*a* of the hub wheel body 30, i.e. the inner ring, the slinger flange portion 91 which curves from the one end portion 90*a* of the slinger cylindrical portion 90 to the wheel side so as to be spaced apart from a concave curved face 31*a* of the rising base portion 31 and which is formed along the rising portion 32*a* of the flange 32, and the slinger outer diametrical cylindrical portion 92 which is formed so as to overlap in the diametrical direction with the step portion 32*b* from the outer diametrical side end portion 91*a* of the slinger flange portion 91 and so as to project approximately in parallel with the shaft L.

The seal member 10 is provided with the core member 11 and the seal lip member 12. The core member 11 is formed by pressing a steel plate such as SPCC, and has a core member cylindrical portion 110 which is fitted to an inner circumferential face 2*d* of the outer ring 2, a projecting portion 111 which is formed so as to project in a curved shape from a vehicle body side end portion 110*a* of the core member cylindrical portion 110 to the vehicle body side, an inner diametrical side circular plate portion 112 which is formed so as to extend from an inner diametrical side end portion 111*a* of the projecting portion 111 to an inner diametrical side, and an outer diametrical side circular plate portion 113 which is formed so as to extend from a wheel side end portion 110*b* of the core member cylindrical portion 110 to the outer diametrical side. The outer diametrical side circular plate portion 113 is covered with the seal lip member 12 which is composed of the elastic member to be described below; the outer diametrical side circular plate portion 113 abuts on a wheel side end face 2*c* of the outer ring 2 through the seal lip member 12.

The seal lip member 12 is composed of the elastic member, is formed so as to be integrally fixed to the core member 11, and has a seal lip base portion 120 and seal lip portions 121, 122, 123 which are formed so as to extend from the seal lip base portion 120. The seal lip base portion 120 is arranged so as to wrap around a part of a vehicle body side face 112*a* of an end portion 112*b* of the inner diametrical side circular plate portion 112 of the core member 11, and is arranged so as to entirely cover a wheel side face 112*c*, a wheel side face 111b of the projecting portion 111, an inner diametrical side face 110c of the core member cylindrical portion 110, and a wheel side face 113a of the outer diametrical side circular plate portion 113. Further, the seal lip base portion 120 is arranged so as to wrap around an outer diametrical side end portion 113b of the outer diametrical side circular plate portion 113 and so as to also cover an entire face of a vehicle body side face 113c. Thus, the seal lip base portion 120 wraps around the outer diametrical side end portion 113b of the outer diametrical side circular plate portion 113 and covers the entire face of the vehicle body side face 113c; a portion thereof abuts on the wheel side end face 2c of the outer ring 2, and the elastic member is interposed between the outer diametrical side circular plate portion 113 and the wheel side end face 2c. Thereby, intrusion of muddy water or the like between the outer ring 2 and the outer diametrical side circular plate portion 113 of the core member 11 is suppressed.

The seal lip portions 121, 122 are side lips which are arranged in the axial direction, and are formed so as to extend from the seal lip base portion 120 to the wheel side and so as to contact a slinger member 9. Specifically, of the three seal lip portions 121, 122, 123, the seal lip portion 121 is provided on an outermost diametrical side, and is arranged so as to slidably contact a straight region of the slinger flange portion 91. Of the three seal lip portions 121, 122, 123, the seal lip portion 122 is formed at an intermediate position and is arranged so as to slidably contact a curved region of the slinger flange portion 91. Distal end portions 121a, 122a of the seal lip portions 121, 122 are formed so as to face toward an outside space side. Of the three seal lip portions 121, 122, 123, the seal lip portion 123 is a radial lip which is provided on an innermost diametrical side, and is formed so as to extend from the seal lip base portion 120 to the inner diametrical side and so as to slidably contact the slinger cylindrical portion 90. The seal lip portion 123 is formed in such a manner that a distal end portion 123a thereof faces toward a bearing space S side. By the seal lip portions 121, 122 constituted as above, intrusion of muddy water or the like from an outside space into the bearing space S is suppressed. By the seal lip portion 123, intrusion of lubricant such as grease in the bearing space S into the bearing sealing device 8A is suppressed.

The seal outer diametrical cylindrical portion 13 is provided at the outer diametrical side end portion of the seal member 10. The seal outer diametrical cylindrical portion 13 of the embodiment is not provided with the core member 11, and is formed only by the elastic member. Specifically, the seal outer diametrical cylindrical portion 13 illustrated in FIG. 2A projects from an outer diametrical side end portion 120a of the seal lip base portion 120 so as to overlap with the step portion 32b in the diametrical direction, is formed so as to overlap with the slinger outer diametrical cylindrical portion 92 approximately in parallel and in the diametrical direction, and has the region 13a facing the outer circumferential face 92a of the slinger outer diametrical cylindrical portion 92. The projecting distal end portion 13b of the seal outer diametrical cylindrical portion 13 is formed so as to project toward the side of the step portion 32b further than the projecting distal end portion 92b of the slinger outer diametrical cylindrical portion 92, and is arranged adjacent to the step portion 32b. As the projecting distal end portion 13b of the seal outer diametrical cylindrical portion 13 is projected so as to be closer toward the side of the step portion 32b than the projecting distal end portion 92b of the slinger outer diametrical cylindrical portion 92, the projecting distal end portion 13b of the seal outer diametrical cylindrical portion 13 and the projecting distal end portion 92b of the slinger outer diametrical cylindrical portion 92 are arranged to overlap in the diametrical direction. Therefore, an opening, corresponding to "a second gap R2" to be described below, located at an outermost diametrical side of the slinger 9 is guarded by the seal outer diametrical cylindrical portion 13, and an effect of suppressing intrusion of muddy water or the like from outside is improved. As a fitting face between the flange 32 and the slinger member 9, specifically, an abutting face between the rising portion 32a and the slinger flange portion 91, is doubly covered with the seal outer diametrical cylindrical portion 13 and the slinger outer diametrical cylindrical portion 92, seal function in the abutting face is also improved and life of the bearing sealing device 8A is prolonged.

As illustrated in FIG. 2A, a thickness "t1" of the seal outer diametrical cylindrical portion 13 of the embodiment is formed greater than a thickness "t2" of the slinger outer diametrical cylindrical portion 92. As the seal outer diametrical cylindrical portion 13 is constituted by the elastic member in the embodiment, structure of different thickness is easily achieved; in such a case, the seal outer diametrical cylindrical portion 13 which is arranged at an outward space side further than the slinger cylindrical portion 90 securely guards against intrusion of muddy water or the like. Rigidity of the seal outer diametrical cylindrical portion 13 which is arranged at the outward space side further than the slinger outer diametrical cylindrical portion 92 is enhanced, thereby improving the effect of suppressing intrusion of muddy water or the like from outside. In the embodiment illustrated in FIG. 2A, the thickness "t1" of the seal outer diametrical cylindrical portion 13 is formed thick and an outer diametrical face 13d of the seal outer diametrical cylindrical portion 13 is arranged so as to slightly project toward the outer diametrical side further than an outer circumferential face 2b of the outer ring 2. Thereby, the outer diametrical face 13d which projects toward the outer diametrical side further than the outer ring 2 of the seal lip member 12 functions as a weir which blocks intrusion of muddy water or the like adhered to the outer ring 2 through the outer circumferential face 2b into the bearing sealing device 8A.

In the embodiment, the slinger member 9 and the seal member 10 are provided in such a manner that a width dimension X in the shaft L direction of a first gap R1 which is formed between the projecting distal end portion 13b of the seal outer diametrical cylindrical portion 13 and the step portion 32b is smaller than a width dimension Y in the shaft L direction of the second gap R2 which is formed between the projecting distal end portion 92b of the slinger outer diametrical cylindrical portion 92 and the step portion 32b. Thereby, an intrusion port of muddy water or the like becomes narrow and intrusion of muddy water or the like is more securely guarded. The slinger outer diametrical cylindrical portion 92 is constituted in such a manner that the outer diametrical direction thereof is covered by the seal outer diametrical cylindrical portion 13 and the projecting distal end portion 13b of the seal outer diametrical cylindrical portion 13 projects toward the side of the step portion 32b further than the projecting distal end portion 92b of the slinger outer diametrical cylindrical portion 92. Accordingly, even if muddy water or the like intrudes from the first gap R1, muddy water or the like hardly contacts the slinger outer diametrical cylindrical portion 92; intrusion (reaching) of muddy water or the like into a diametrical direction gap R3 which is formed between the outer circumferential face 92a of the slinger outer diametrical cylindrical portion 92 and the region 13a facing the outer circumferential face 92a of the slinger outer diametrical cylindrical portion 92 of the seal outer diametrical cylindrical portion 13 (an inner circumferential face of the seal outer diametrical cylindrical portion 13) is suppressed. A width dimension Z in the diametrical direction of the diametrical direction gap R3 is formed smaller than the width dimension X in the shaft L direction of the first gap R1. Thereby, a labyrinth in which intrusion of muddy water or the like is further suppressed is formed. Thus, by the above-mentioned structure, the first gap R1 which becomes the intrusion port of muddy water or the like and which is provided on the outermost diametrical side is made narrower; even if muddy water or the like passes through the first gap R1, muddy water or the like is guided into a space Si which is formed by the step portion 32b, and is discharged toward the outside space through the step portion 32b from a downward side in the vertical direction.

Modified Example of First Embodiment

A modified example of the first embodiment is described below with reference to FIG. 2B. Common portions with the first embodiment are allotted with the same reference signs as many as possible and the explanation for common structure and effects is omitted.

Figure 2B:
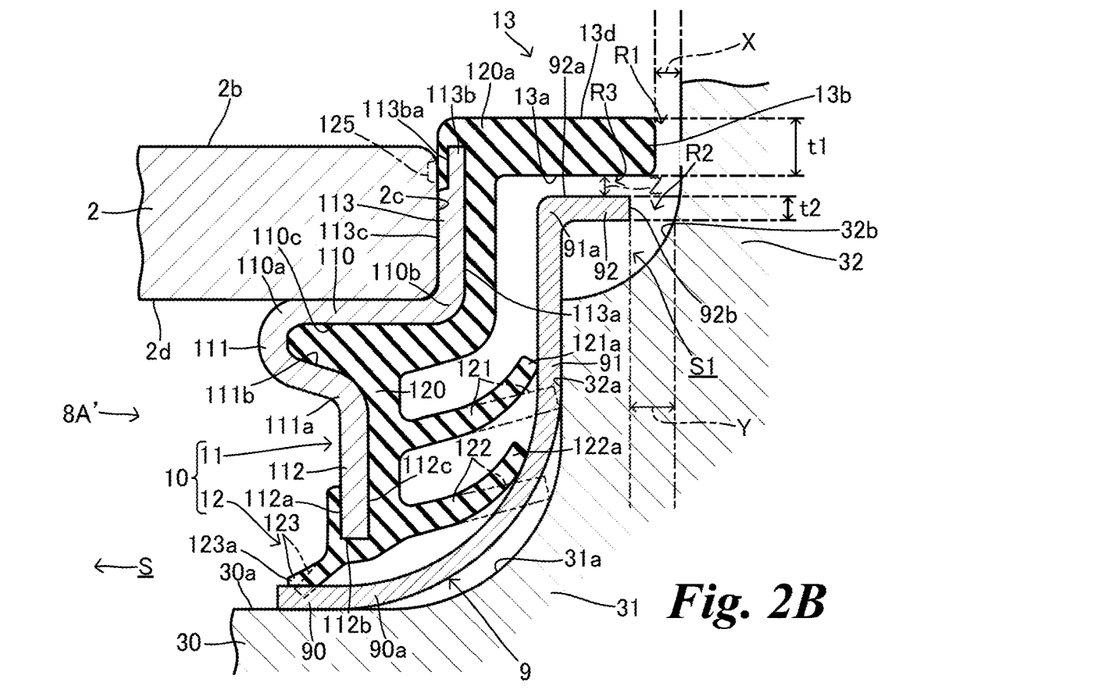
FIG. 2B is similar to FIG. 2A and illustrates a modified example of the embodiment.

A bearing sealing device 8A' in FIG. 2B which is the modified example of the first embodiment has a different structure of the seal member 10 from the bearing sealing device 8A of the first embodiment. Specifically, the elastic member (the seal lip member 12) is not interposed between the outer diametrical side circular plate portion 113 of the core member 11 and the wheel side end face 2c of the outer ring 2, and the outer diametrical side circular plate portion 113 directly contacts the wheel side end face 2c. Namely, the outer diametrical side circular plate portion 113 is formed so as to extend along the wheel side end face 2c of the outer ring 2 from the wheel side end portion 110b of the core member cylindrical portion 110 of the core member 11 to the outer diametrical side. The outer diametrical side end portion 113b of the outer diametrical side circular plate portion 113 is formed with a recess 113ba which is cut out toward a side of the vehicle body side face 113c. The seal lip base portion 120 of the seal lip member 12 wraps around the outer diametrical side end portion 113b of the outer diametrical side circular plate portion 113 and reaches the recess 113ba. A portion of the seal lip base portion 120 which reaches the recess 113ba is formed with a raised annular projection portion 125 which is formed so as to elastically contact the wheel side end face 2c. When the core member 11 is fitted into the outer ring 2, the annular projection portion 125 is interposed in a compressed state between the wheel side end face 2c of the outer ring 2 and the recess 113ba of the outer diametrical side circular plate portion 113 of the core member 11. By the annular projection portion 125, intrusion of muddy water or the like into a fitting region between the wheel side end face 2c of the outer ring 2 and the core member 11 is prevented. In the figure, a two-dot chain line of the annular projection portion 125 illustrates the original form before compression.

Other structures of the seal outer diametrical cylindrical portion 13, the slinger outer diametrical cylindrical portion 92, and the like are the same as the first embodiment.

Second Embodiment

Figure 3:
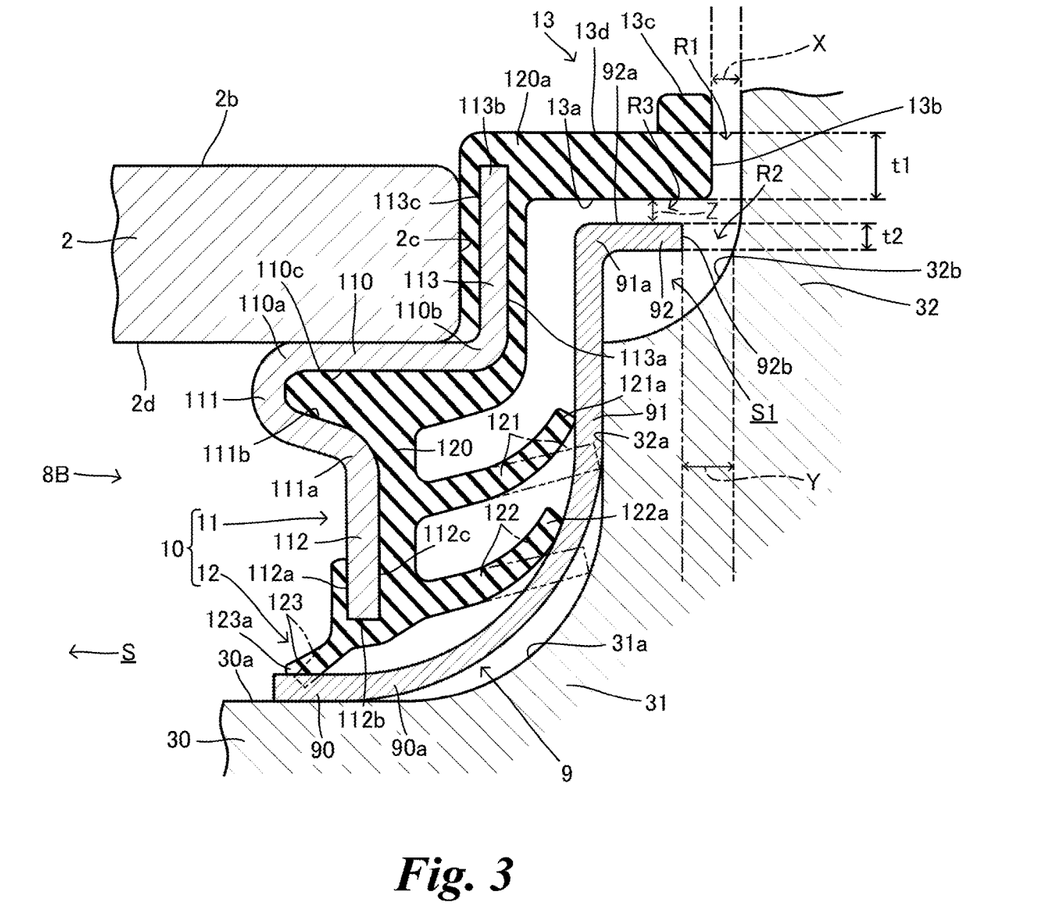
FIG. 3 is a schematic sectional view diagrammatically illustrating a bearing sealing device of a second embodiment of the present invention.

A second embodiment is explained below with reference to FIG. 3. Common portions with the first embodiment are allotted with the same reference signs as many as possible and the explanation for common structure and effects is omitted.

A bearing sealing device 8B of the second embodiment differs from the bearing sealing device 8A of the first embodiment in that a weir portion 13c which is formed so as to project from the projecting distal end portion 13b of the seal outer diametrical cylindrical portion 13 to the outer diametrical side is provided. As illustrated in FIG. 3, the weir portion 13c which is formed so as to project from the projecting distal end portion 13b of the seal outer diametrical cylindrical portion 13 to the outer diametrical side is provided at an end portion of the seal outer diametrical cylindrical portion 13. Accordingly, the seal outer diametrical cylindrical portion 13 is formed thicker than the slinger outer diametrical cylindrical portion 92, and the outer diametrical side end portion 120a of the seal lip member 12 is arranged on the outer diametrical side further than the outer circumferential face 2b of the outer ring 2. Thereby, intrusion of muddy water or the like which attacks from the outer circumferential face 2b of the outer ring 2 through the outer circumferential face 2b into the bearing sealing device 8B is blocked. As a diametrical direction length of the first gap R1 becomes greater than that in the example of the first embodiment, a labyrinth effect is enhanced and the effect of suppressing intrusion of muddy water or the like is improved. Other structures of the seal outer diametrical cylindrical portion 13, the slinger outer diametrical cylindrical portion 92, and the like are the same as the first embodiment.

Third Embodiment

Figure 4:
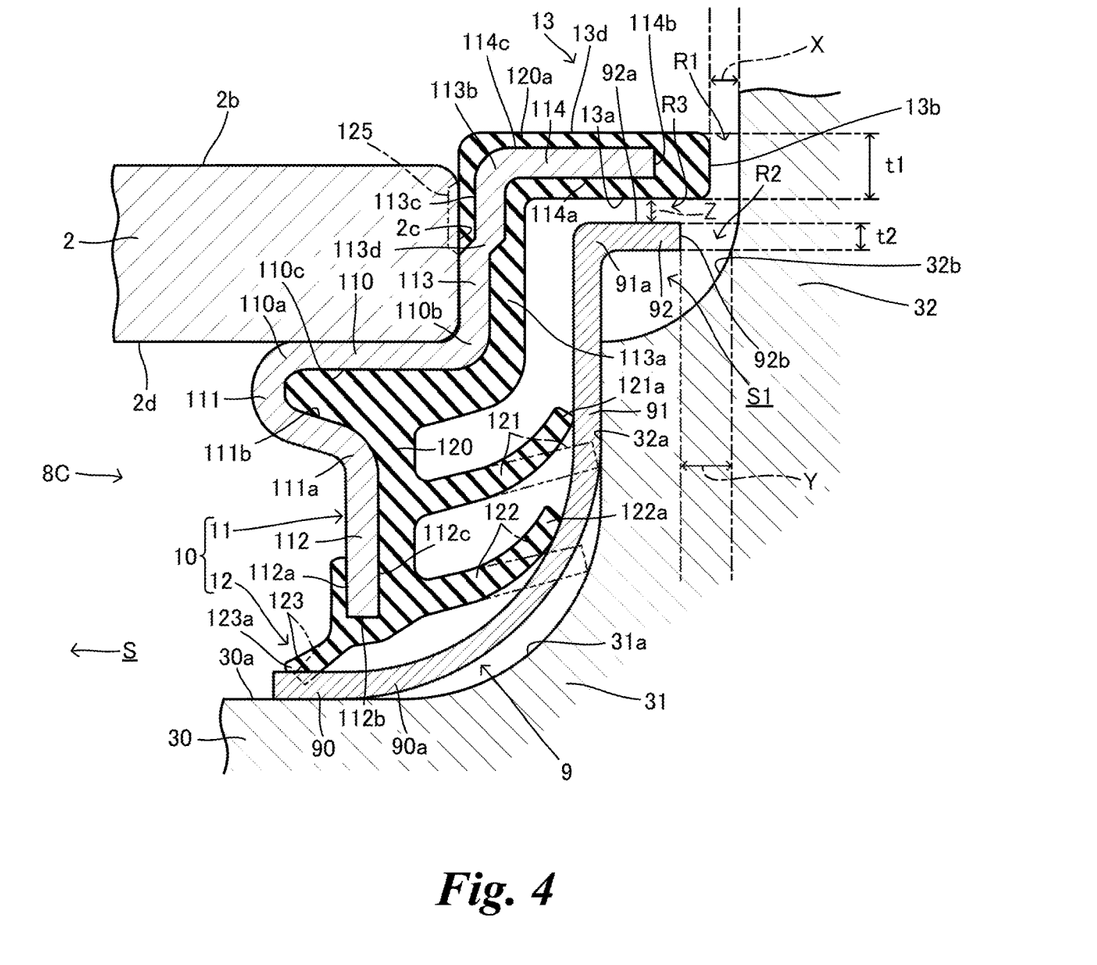
FIG. 4 is a schematic sectional view diagrammatically illustrating a bearing sealing device of a third embodiment of the present invention.

A third embodiment is explained below with reference to FIG. 4. Common portions with the first embodiment are allotted with the same reference signs as many as possible and the explanation for common structure and effects is omitted.

A bearing sealing device 8C of the third embodiment differs from the bearing sealing device 8A of the first embodiment in that the seal outer diametrical cylindrical portion 13 is formed by the core member 11 and the elastic member. In other words, the core member 11 which supports the elastic member is arranged in the bearing sealing device 8C while the example in which the seal outer diametrical cylindrical portion 13 is structured only by the elastic member is explained as mentioned above in the bearing sealing devices 8A, 8A' of the first embodiment and the bearing sealing device 8B of the second embodiment. In addition to the core member cylindrical portion 110, the projecting portion 111, the inner diametrical side circular plate portion 112, and the outer diametrical side circular plate portion 113 as mentioned above, the core member 11 includes a second core member cylindrical portion 114 which projects from the outer diametrical side end portion 113b of the outer diametrical side circular plate portion 113 so as to overlap with the step portion 32b in the diametrical direction. The second core member cylindrical portion 114 is formed so as to overlap with the slinger outer diametrical cylindrical portion 92 approximately in parallel and in the diametrical direction. In the embodiment illustrated in FIG. 4, an example in which an end portion 114b thereof is formed on the vehicle body side further than a position of the projecting distal end portion 92b of the slinger outer diametrical cylindrical portion 92 is shown. However, the end portion 114b can be provided approximately at the same position or can be arranged so as to project toward a side of the flange 32 further than the position of the projecting distal end portion 92*b*.

The seal lip base portion 120 of the seal lip member 12 is arranged so as to cover an entire face of an inner circumferential face 114*a* of the second core member cylindrical portion 114, so as to wrap around the end portion 114*b* on the wheel side and cover an entire face of an outer circumferential face 114*c*, and so as to wrap around the outer diametrical side end portion 113*b* of the outer diametrical side circular plate portion 113 and reach the vehicle body side face 113*c*. The annular projection portion 125 which bulges on the vehicle body side is formed at a portion of the seal lip base portion 120 which reaches the vehicle body side face 113*c*, and is formed longer in the diametrical direction than the example illustrated in FIG. 2B.

By the embodiment, the rigidity of the seal outer diametrical cylindrical portion 13 is enhanced as compared with the first embodiment because the seal outer diametrical cylindrical portion 13 is constituted by the second core member cylindrical portion 114 of the core member 11 and the elastic member of a portion which covers the second core member cylindrical portion 114; and the second core member cylindrical portion 114 of the core member 11 becomes a core of the seal outer diametrical cylindrical portion 13.

Fourth Embodiment

Figure 5:
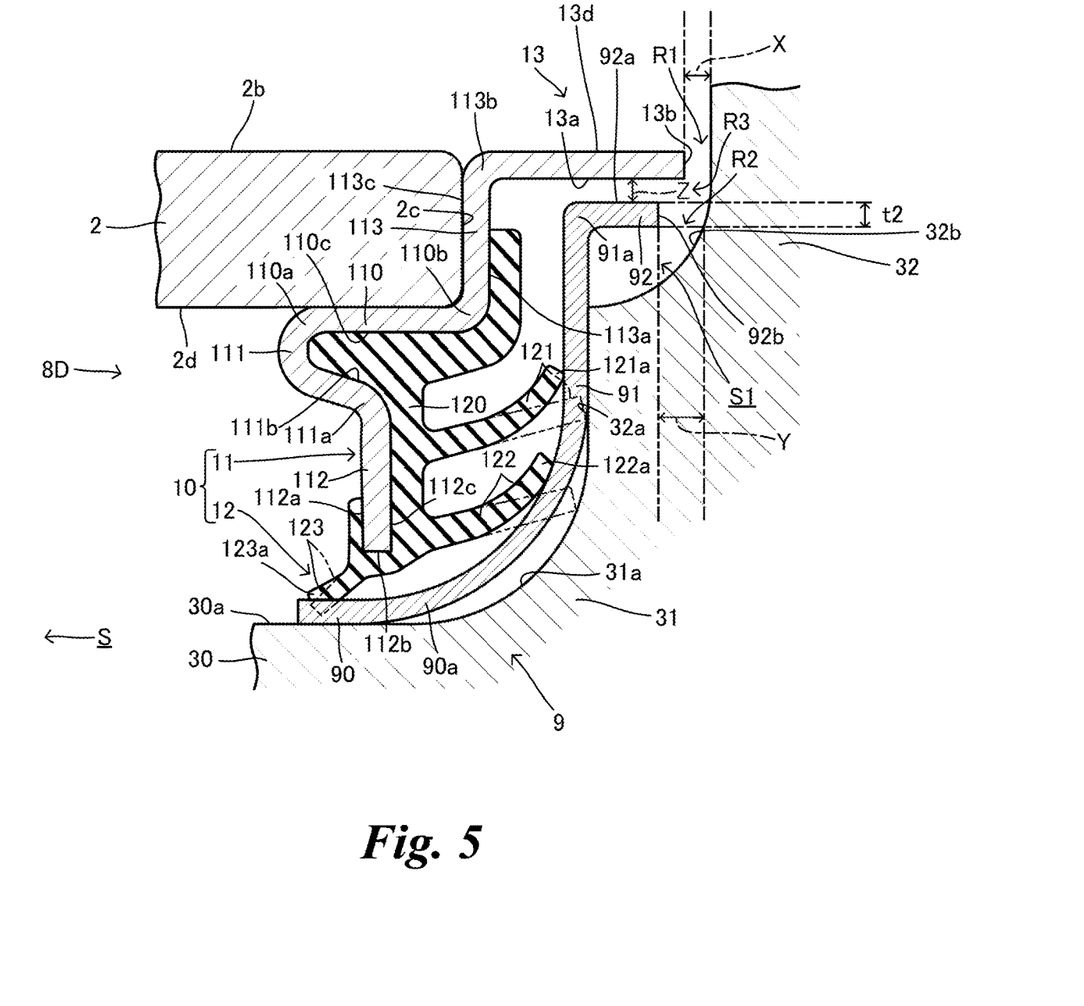
FIG. 5 is a schematic sectional view diagrammatically illustrating a bearing sealing device of a fourth embodiment of the present invention.

A fourth embodiment is explained below with reference to FIG. 5. Common portions with the first embodiment are allotted with the same reference signs as many as possible and the explanation for common structure and effects is omitted.

A bearing sealing device 8D of the fourth embodiment differs from the first embodiment in that the seal outer diametrical cylindrical portion 13 is formed by the core member 11. Accordingly, the outer diametrical side circular plate portion 113 of the core member 11 extends along the wheel side end face 2*c* of the outer ring 2 from the wheel side end portion 110*b* of the core member cylindrical portion 110 to the outer diametrical side, and is formed in such a manner that the seal outer diametrical cylindrical portion 13 which projects from the end portion 113*b* thereof so as to overlap with the step portion 32*b* in the diametrical direction overlaps with the slinger outer diametrical cylindrical portion 92 approximately in parallel and in the diametrical direction. The projecting distal end portion 13*b* of the seal outer diametrical cylindrical portion 13 projects toward the side of the step portion 32*b* further than the projecting distal end portion 92*b* of the slinger outer diametrical cylindrical portion 92. Also in the embodiment, the width dimension X in the shaft L direction of the first gap R1, the width dimension Y in the shaft L direction of the second gap R2, and the width dimension Z in the diametrical direction of the diametrical direction gap R3 can be the same as the first embodiment. The embodiment differs from the first embodiment in that the seal lip member 12 is arranged so as to cover a part of the wheel side face 113*a* of the outer diametrical side circular plate portion 113. However, other structures of the seal lip base portion 120, the seal lip portions 121, 122, 123 are the same as the first embodiment.

Fifth Embodiment

Figure 6:
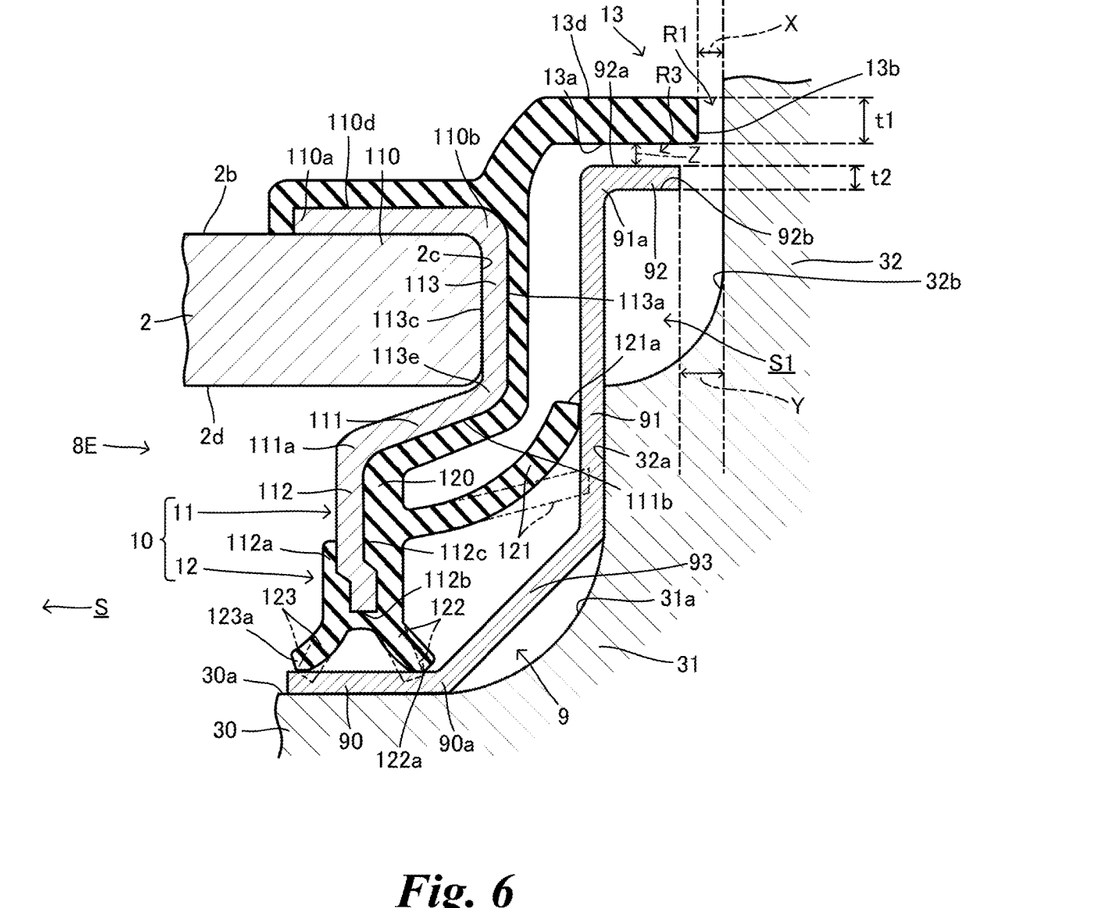
FIG. 6 is a schematic sectional view diagrammatically illustrating a bearing sealing device of a fifth embodiment of the present invention.

A fifth embodiment is explained below with reference to FIG. 6. Common portions with the first embodiment are allotted with the same reference signs as many as possible and the explanation for common structure and effects is omitted.

A bearing sealing device 8E of the fifth embodiment is the same as the first embodiment in that the seal outer diametrical cylindrical portion 13 is constituted only by the elastic member and has the region 13*a* facing the outer circumferential face 92*a* of the slinger outer diametrical cylindrical portion 92, but differs in the following points.

The slinger member 9 includes the slinger cylindrical portion 90 which is fitted to the outer diametrical face 30*a* of the hub wheel body 30, i.e. the inner ring, an inclined portion 93 which rises and inclines from the one end portion 90*a* of the slinger cylindrical portion 90 toward the wheel side so as to be spaced apart from the concave curved face 31*a* of the rising base portion 31, the slinger flange portion 91 which is formed along the rising portion 32*a* of the flange 32, and the slinger outer diametrical cylindrical portion 92 which is formed so as to overlap in the diametrical direction with the step portion 32*b* from the outer diametrical side end portion 91*a* of the slinger flange portion 91 and so as to project approximately in parallel with the shaft L. Namely, the slinger member 9 of the embodiment differs from the slinger member 9 shown in the first embodiment or the like in that the inclined portion 93 which is formed inclined without being along the concave curved face 31*a* is provided. The slinger flange portion 91 is formed so as to extend longer toward the outer diametrical side than that of the first embodiment. Accordingly, the slinger outer diametrical cylindrical portion 92 is arranged on the outer diametrical side further than the outer circumferential face 2*b* of the outer ring 2.

The core member 11 has the core member cylindrical portion 110, the outer diametrical side circular plate portion 113, the projecting portion 111, and the inner diametrical side circular plate portion 112. The core member cylindrical portion 110 is fitted to the outer circumferential face 2*b* of the outer ring 2 instead of the inner circumferential face 2*d*, the outer diametrical side circular plate portion 113 is formed along the wheel side end face 2*c* of the outer ring 2 from the wheel side end portion 110*b* of the core member cylindrical portion 110, the projecting portion 111 is formed inclined from an inner diametrical side end portion 113*e* of the outer diametrical side circular plate portion 113 toward the bearing space S side, and the inner diametrical side circular plate portion 112 is formed so as to extend from the inner diametrical side end portion 111*a* of the projecting portion 111 to the inner diametrical side.

The seal lip base portion 120 wraps around the end portion 112*b* on the inner diametrical side from a part on the inner diametrical side of the vehicle body side face 112*a* of the inner diametrical side circular plate portion 112 of the core member 11, and covers an entire face of the wheel side face 112*c*. The seal lip base portion 120 further covers an entire face of the wheel side face 111*b* of the projecting portion 111, the wheel side face 113*a* of the outer diametrical side circular plate portion 113, an outer diametrical side face 110*d* of the core member cylindrical portion 110, and the vehicle body side end portion 110*a*. The seal outer diametrical cylindrical portion 13 is provided at an end portion which rises and inclines toward the wheel side from a portion of the seal lip base portion 120 which covers the wheel side end portion 110*b* of the core member cylindrical portion 110. The thickness "t1" of the seal outer diametrical cylindrical portion 13 is formed thicker than the thickness "t2" of the slinger outer diametrical cylindrical portion 92.

The seal lip portion 121 is a side lip and is formed so as to extend from the seal lip base portion 120 to the wheel side and so as to slidably contact the slinger flange portion 91 of the slinger member 9. The seal lip portions 122, 123 of the embodiment are radial lips; the distal end portion 122a of the seal lip portion 122 is formed so as to face toward a side of the rising base portion 31; and the distal end portion 123a of the seal lip portion 123 is formed so as to face toward the bearing space S side.

Even when the structures of the slinger member 9, the core member 11, and the seal lip member 12 differ from the above mentioned, if the seal outer diametrical cylindrical portion 13 and the slinger outer diametrical cylindrical portion 92 are constituted as above, an effect which is similar to the first embodiment is obtained.

The forms and the structures of the bearing sealing devices 8, 8A to 8E are not limited to those in the figures. For instance, although the seal lip portions 121, 122, 123 are constituted so as to slidably contact the slinger member 9, any of the plural seal lip portions can be adjacent to the slinger member 9 without slidably contacting the slinger member 9, or the core member 11 can be without the projecting portion 111 (refer to FIG. 2A or the like). The seal outer diametrical cylindrical portion 13 as illustrated in FIGS. 2A, 2B, 3 and 6 can be constituted by the core member 11 only or by the core member 11 and the elastic member; in such a case, the seal outer diametrical cylindrical portion 13 can be constituted in such a manner that the core member 11 is formed by bending. A portion corresponding to the weir portion 13c illustrated in FIG. 3 can also be formed by bending the end portion of the seal outer diametrical cylindrical portion 13 constituted by the core member 11 illustrated in FIG. 5. A formation position of the step portion 32b which is formed at the flange 32, an arrangement of the outer ring 2 and the like are not limited to those in the figure. Material of each member which constitutes the bearing sealing devices 8, 8A to 8E is not limited to the above-mentioned material, and can be appropriately selected. A relation between the thickness "t1" of the seal outer diametrical cylindrical portion 13 and the thickness "t2" of the slinger outer diametrical cylindrical portion 92 is not limited to that in the figure, and is desired to be set in such a manner that "t1" becomes a value between a value twice as much as "t2" and a value three times as much as "t2". Although FIG. 5 illustrates an example with almost the same thickness, a steel plate which forms the core member 11 can be selected to be thicker than that of the slinger member 9, and can be pressed so that the thickness of the core member 11 is made greater than that of the slinger member 9.

REFERENCE SIGNS LIST 1 bearing device
2 outer ring
3 hub wheel
30 hub wheel body
30a outer diametrical face
32 flange
32b step portion
5 inner ring
8, 8A to 8E bearing sealing device
9 slinger member
90 slinger cylindrical portion
90a one end portion
91 slinger flange portion
91a outer diametrical side end portion
92 slinger outer diametrical cylindrical portion
92a outer circumferential face
92b projecting distal end portion
10 seal member
11 core member
12 seal lip member
121, 122, 123 seal lip portion
13 seal outer diametrical cylindrical portion
13a facing region
13b projecting distal end portion

The invention claimed is:

1. A bearing sealing device mounted in a bearing device having an outer ring and an inner ring, the inner ring having a flange, the bearing sealing device comprising:
   a slinger member which is fitted to the inner ring; and
   a seal member which is fitted to the outer ring, the slinger member having a slinger cylindrical portion which is fitted to an outer diametrical face of the inner ring, a slinger flange portion which extends along the flange from one end portion of the slinger cylindrical portion to an outer diametrical side, and a slinger outer diametrical cylindrical portion which projects from an outer diametrical side end portion of the slinger flange portion so as to overlap in a diametrical direction with a step portion which is formed in a stepped shape in the flange of the inner ring, and
   the seal member having a core member which is fitted to the outer ring, and a seal lip member which is constituted with an elastic member fixed to the core member and has a seal lip portion which contacts or is adjacent to the slinger member,
   wherein a seal outer diametrical cylindrical portion, which has a region facing an outer circumferential face of the slinger outer diametrical cylindrical portion and projects so as to overlap in the diametrical direction with the step portion, is provided on an outer diametrical side end portion of the seal member, and wherein a projecting distal end portion of the seal outer diametrical cylindrical portion projects toward a side of the step portion further than a projecting distal end portion of the slinger outer diametrical cylindrical portion.

2. The bearing sealing device as set forth in claim 1, wherein a thickness of the seal outer diametrical cylindrical portion is greater than a thickness of the slinger outer diametrical cylindrical portion.

3. The bearing sealing device as set forth in claim 1, wherein a gap which is formed between the projecting distal end portion of the seal outer diametrical cylindrical portion and the step portion is smaller than a gap which is formed between the projecting distal end portion of the slinger outer diametrical cylindrical portion and the step portion.

4. The bearing sealing device as set forth in claim 1,
   wherein a gap in the diametrical direction between the slinger outer diametrical cylindrical portion and the seal outer diametrical cylindrical portion is smaller than a gap which is formed between the projecting distal end portion of the slinger outer diametrical cylindrical portion and the step portion.

5. The bearing sealing device as set forth in claim 1, wherein the seal outer diametrical cylindrical portion is constituted by at least one of the elastic member and the core member.

6. The bearing sealing device as set forth in claim 2, wherein a gap which is formed between the projecting distal end portion of the seal outer diametrical cylindrical portion and the step portion is smaller than a gap which is formed between the projecting distal end portion of the slinger outer diametrical cylindrical portion and the step portion.

7. The bearing sealing device as set forth in claim 2, wherein a gap in the diametrical direction between the slinger outer diametrical cylindrical portion and the seal outer diametrical cylindrical portion is smaller than a gap which is formed between the projecting distal end portion of the slinger outer diametrical cylindrical portion and the step portion.

8. The bearing sealing device as set forth in claim 3, wherein a gap in the diametrical direction between the slinger outer diametrical cylindrical portion and the seal outer diametrical cylindrical portion is smaller than the gap which is formed between the projecting distal end portion of the slinger outer diametrical cylindrical portion and the step portion.

9. The bearing sealing device as set forth in claim 2, wherein the seal outer diametrical cylindrical portion is constituted by at least one of the elastic member and the core member.

10. The bearing sealing device as set forth in claim 3, wherein the seal outer diametrical cylindrical portion is constituted by at least one of the elastic member and the core member.

11. The bearing sealing device as set forth in claim 4 wherein the seal outer diametrical cylindrical portion is constituted by at least one of the elastic member and the core member.

* * * * *